United States Patent
Suzuki

(10) Patent No.: US 9,245,213 B2
(45) Date of Patent: Jan. 26, 2016

(54) APPARATUS, METHOD AND STORAGE MEDIUM FOR STORING PROGRAM FOR PRINTING AN IMAGE ACCORDING TO AN APPROPRIATE PRINT SETTING

(71) Applicant: CANON KABUSHIKI KAISHA, Tokyo (JP)

(72) Inventor: Takeshi Suzuki, Inagi (JP)

(73) Assignee: CANON KABUSHIKI KAISHA (JP)

( * ) Notice: Subject to any disclaimer, the term of this patent is extended or adjusted under 35 U.S.C. 154(b) by 0 days.

(21) Appl. No.: 13/925,952

(22) Filed: Jun. 25, 2013

(65) Prior Publication Data

US 2014/0009776 A1    Jan. 9, 2014

(30) Foreign Application Priority Data

Jul. 5, 2012  (JP) .................................. 2012-151808

(51) Int. Cl.
*G06K 15/02* (2006.01)
*G06K 15/00* (2006.01)
*G06F 3/12* (2006.01)
*H04N 1/00* (2006.01)

(52) U.S. Cl.
CPC .......... *G06K 15/1807* (2013.01); *G06F 3/1204* (2013.01); *G06F 3/1258* (2013.01); *G06F 3/1288* (2013.01); *G06K 15/002* (2013.01); *H04N 1/00108* (2013.01); *H04N 1/00127* (2013.01); *H04N 1/00137* (2013.01)

(58) Field of Classification Search
CPC ............................. G06F 3/1204; G06F 3/1258
USPC ......... 358/1.13, 1.15; 709/223, 206, 217, 203
See application file for complete search history.

(56) References Cited

U.S. PATENT DOCUMENTS

| | | | |
|---|---|---|---|
| 2011/0063668 A1* | 3/2011 | Shirai | 358/1.15 |
| 2011/0170135 A1* | 7/2011 | Ito | 358/1.15 |
| 2011/0299116 A1* | 12/2011 | Hibino | 358/1.15 |
| 2012/0057197 A1* | 3/2012 | Matsuda | 358/1.15 |
| 2012/0120443 A1* | 5/2012 | Aritomi | 358/1.15 |

FOREIGN PATENT DOCUMENTS

JP    2000-235466 A    8/2000

* cited by examiner

*Primary Examiner* — Jacky X Zheng
(74) *Attorney, Agent, or Firm* — Rossi, Kimms & McDowell LLP

(57) ABSTRACT

On the basis of information indicating a recommended print setting that corresponds to a content, a display device is controlled to display, in a distinguishable manner, the recommended print setting that corresponds to a content to be printed and a print setting different from the recommended print setting. Also, according to the print setting designated by the user, an image based on the content is printed by a printing device.

18 Claims, 13 Drawing Sheets

| MFP REQUEST CONTENT | MFP-API | INFORMATION TO BE ACQUIRED |
|---|---|---|
| CONDITION CHECK | API-R1 | AVAILABILITY OF CONTENT PROVIDING FUNCTION |
| CATEGORY LIST REQUEST | API-R5 | CATEGORY LIST |
| CONTENT LIST REQUEST | API-R6 | CONTENT LIST |

F I G. 6

|  | TARGET DEVICE | | | PROVISION START DATE | PROVISION END DATE |
|---|---|---|---|---|---|
|  | MODEL 1 | MODEL 2 | MODEL 3 | | |
| CATEGORY A | ○ | ○ | ○ | 2011/01/01 00:00:00 | 2011/07/01 00:00:00 |
| CATEGORY B | ○ | ○ | × | 2011/04/01 00:00:00 | 2012/01/01 00:00:00 |

FIG. 7

| | TARGET DEVICE | | | TARGET CATEGORY | | PRO-VISION START DATE | PRO-VISION END DATE | RECOMMENDED PRINT SETTING | | | AVAILABLE PRINT SETTING OPTIONS | | | | | | | |
|---|---|---|---|---|---|---|---|---|---|---|---|---|---|---|---|---|---|---|
| | MODEL 1 | MODEL 2 | MODEL 3 | CATE-GORY A | CATE-GORY B | | | PAPER SIZE | PAPER TYPE | BORDER SETTING | A4 BOR-DER-LESS | LTR BOR-DER-LESS | L SIZE BOR-DER-LESS | 4×6 BOR-DER-LESS | A4 BOR-DER | LTR BOR-DER | L SIZE BOR-DER | 4×6 BOR-DER | B5 BOR-DER |
| CON-TENT 1 | ○ | ○ | ○ | ○ | × | 2011/01/01 00:00:00 | 2011/07/01 00:00:00 | A4/LTR | PLAIN PAPER | OK | NA | NA | NA | NA | OK | OK | NA | NA | OK |
| CON-TENT 2 | ○ | ○ | × | × | ○ | 2011/04/01 00:00:00 | 2011/10/01 00:00:00 | L SIZE/4×6 | PHOTO PAPER | NA | NA | NA | OK | OK | NA | NA | OK | OK | NA |
| CON-TENT 3 | ○ | ○ | × | ○ | ○ | 2011/02/01 00:00:00 | 2012/01/01 00:00:00 | A4 | MAT PAPER | OK | OK | OK | OK | OK | OK | OK | OK | OK | OK |

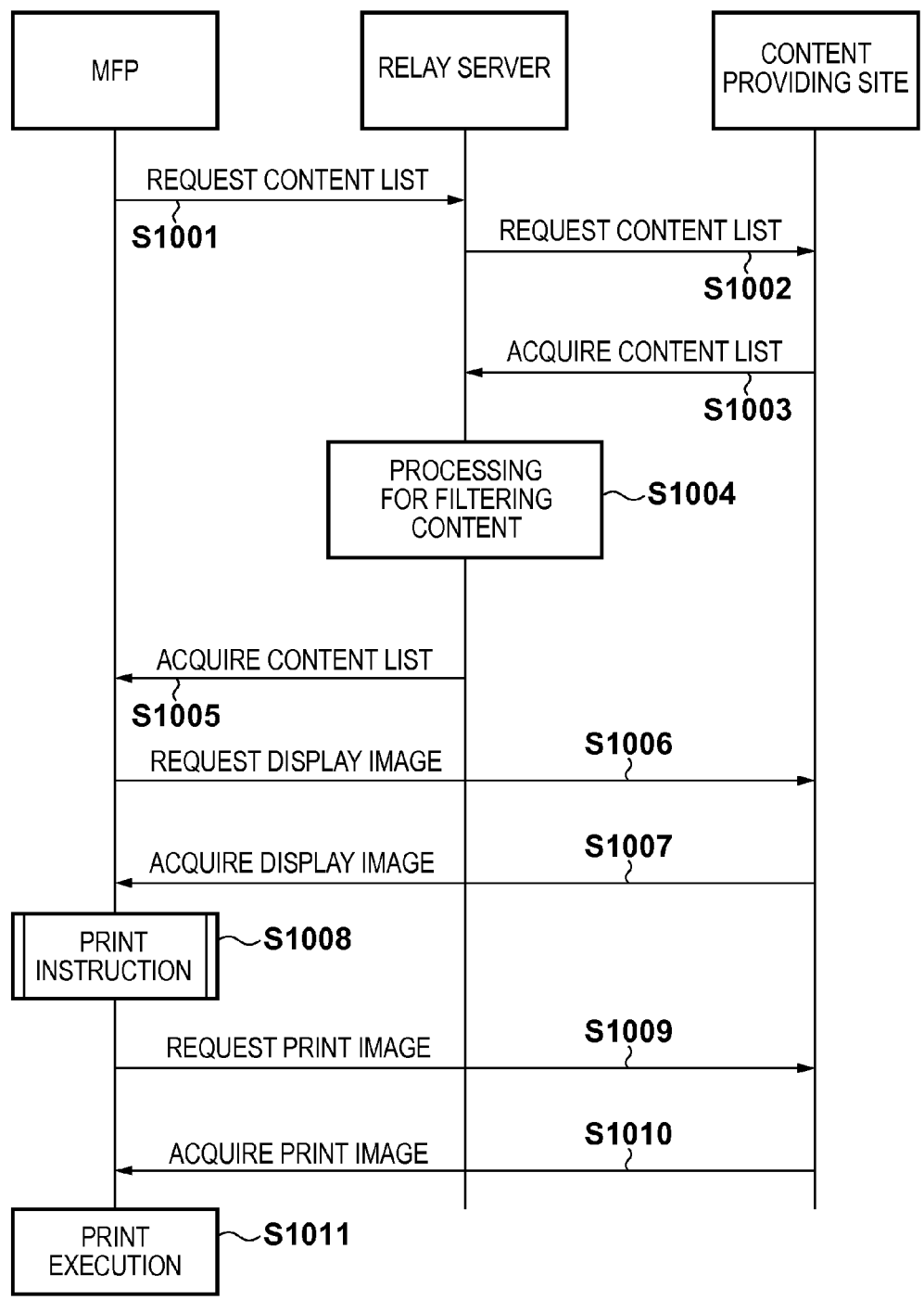

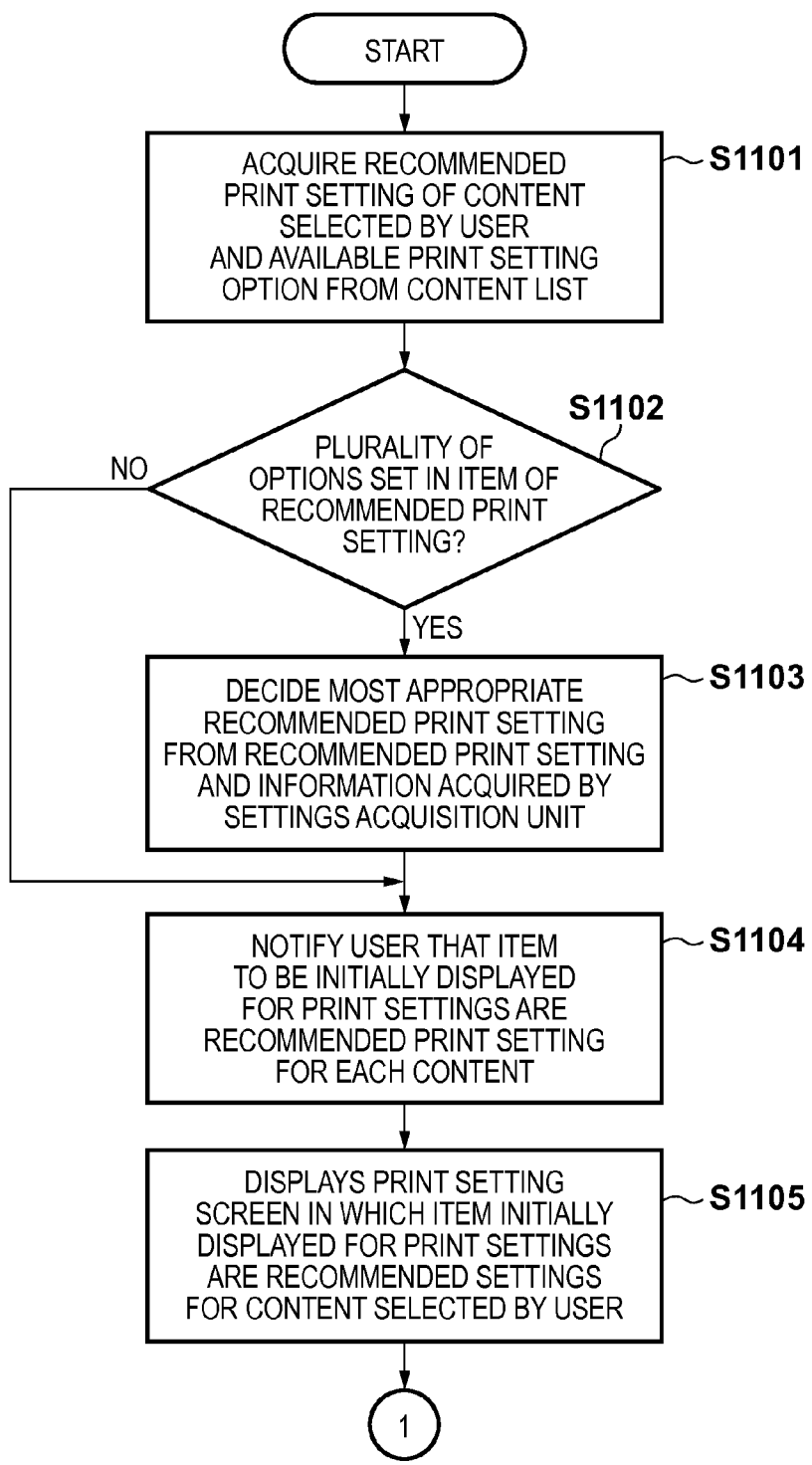

FIG. 12
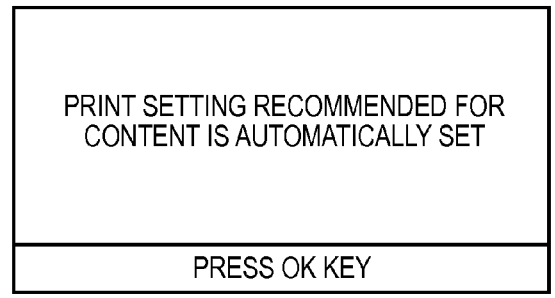
FIG. 13
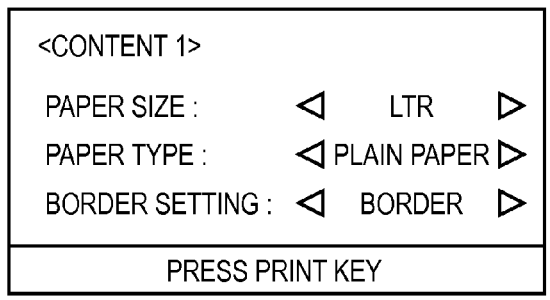
FIG. 14
| PRINT SETTING ITEM | SELECTABLE VALUES |
|---|---|
| PAPER SIZE | A4/LTR/B5/L SIZE/4×6 |
| PAPER TYPE | PLAIN PAPER/MAT PAPER/PHOTO PAPER/ SILK TOUCH PAPER |
| BORDER SETTING | BORDER/BORDERLESS |

FIG. 15

<CONTENT 1>

PAPER SIZE :   ⓘ◁   4×6   ▷

PAPER TYPE :   ◁ PLAIN PAPER ▷

BORDER SETTING :   ◁   BORDER   ▷

PRESS PRINT KEY

FIG. 16

NO DATA CORRESPONDING TO CURRENT PRINT SETTING IN CONTENT

PRESS OK KEY

APPARATUS, METHOD AND STORAGE MEDIUM FOR STORING PROGRAM FOR PRINTING AN IMAGE ACCORDING TO AN APPROPRIATE PRINT SETTING

BACKGROUND OF THE INVENTION

1. Field of the Invention

The present invention relates to an apparatus that causes a printing device to print an image, a method, and a storage medium for storing a program.

2. Description of the Related Art

A multifunctional peripheral (hereinafter, referred to as an MFP) that is provided with a printer function, a scanning function, a card slot function, a fax function, and a network function is generally known. As one function of an MFP, there is a function of obtaining various contents (for example, writing paper, graph paper, check list, staff notation, manuscript paper, and seasonal contents suitable for Halloween, Christmas and the like) via a network and printing the contents. This function enables a user, with respect to a content obtained by the MFP via a network, to set on a user interface screen of the MFP the size, the type, and the like of paper on which the content is to be printed, and to print the content. At this time, print setting options available to the user may include many print settings that are hardly likely to be used, causing a reduction in user-friendliness. Here, "print settings that are hardly likely to be used" refer to printing of split memos with frames on L size paper, printing of contents with ruled lines on premium photo paper, and the like. That is, it is desirable to be able to restrict display of print settings that are hardly likely to be used.

As a method for providing a user with recommended print settings intended by a content creator, Japanese Patent Laid-Open No. 2000-235466 teaches having a database in which a print purpose (presentation, handout, a support documentation, and the like) is set for each content and a database in which the print purposes are associated with recommended print settings. It is also disclosed that when a user prints a content, a print purpose of the content and recommended print settings associated with the print purpose are acquired from the databases, and are displayed on a user interface screen.

However, in Japanese Patent Laid-Open No. 2000-235466, since the recommended print settings that correspond to each content are not displayed, it may not be possible to perform printing with appropriate print settings for the content.

SUMMARY OF THE INVENTION

An aspect of the present invention is to eliminate the above-mentioned problems with the conventional technology. The present invention provides an apparatus that can perform printing of an image according to appropriate print settings, a method, and a storage medium for storing a program.

The present invention in its first aspect provides an apparatus comprising: a selection unit configured to select a content to be printed from a plurality of contents according to an instruction of a user; an acquisition unit configured to acquire information indicating recommended print setting that corresponds to the content selected by the selecting unit; a display control unit configured to control a display device to display, based on the information acquired by the acquisition unit, the recommended print setting that is indicated by the information and corresponds to the content selected by the selection unit, and a print setting different from the recommended print setting, in a distinguishable manner; and a print control unit configured to control a printing device to print an image based on the content selected by the selection unit, according to print setting designated by the user among the recommended print setting and the print setting different from the recommended print setting that are displayed by the display control unit.

According to the present invention, it is possible to print an image according to appropriate print settings.

Further features of the present invention will become apparent from the following description of exemplary embodiments with reference to the attached drawings.

BRIEF DESCRIPTION OF THE DRAWINGS

FIG. 6 illustrates information to be set for categories.

FIG. 7 illustrates information to be set for contents.

FIG. 10 illustrates a flow of processing from after specifying a category until printing of a print image.

FIGS. 11A and 11B illustrate procedures of print setting processing.

FIG. 12 illustrates a screen notifying that recommended settings are initially displayed.

FIG. 13 illustrates a print setting screen.

FIG. 14 illustrates print settings executable by the MFP.

FIG. 15 illustrates a print setting screen on which an error is additionally displayed.

FIG. 16 illustrates a screen warning that printing is not possible with the current print settings.

DESCRIPTION OF THE EMBODIMENTS

Figure 1:
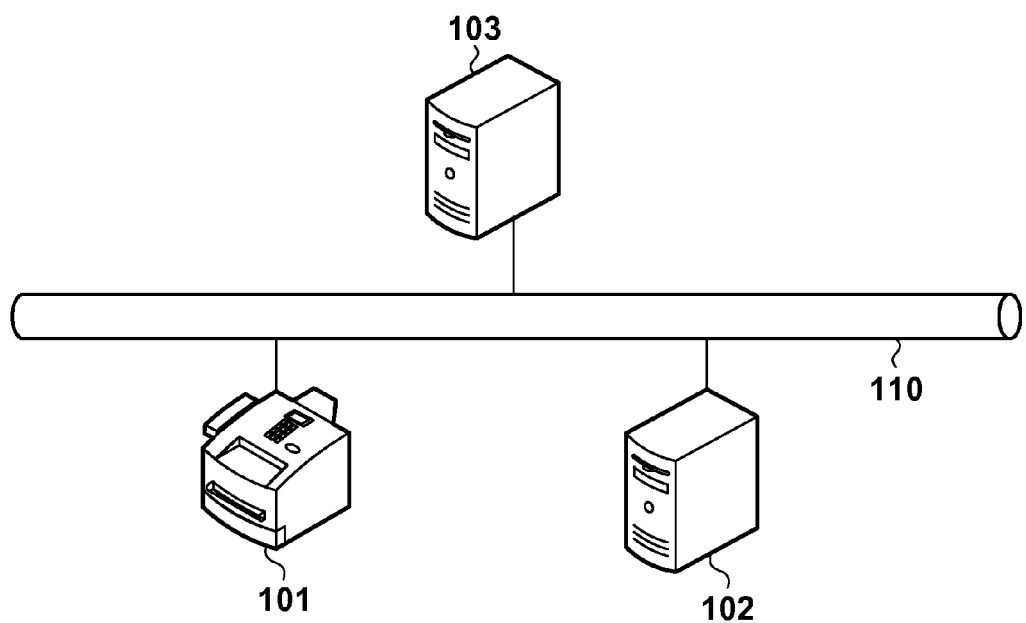
FIG. 1 illustrates a configuration of a web service system.

Preferred embodiments of the present invention will now be described hereinafter in detail, with reference to the accompanying drawings. It is to be understood that the following embodiments are not intended to limit the claims of the present invention, and that not all of the combinations of the aspects that are described according to the following embodiments are necessarily required with respect to the means to solve the problems according to the present invention. Note that the same reference numerals are given to the same constituent components, and descriptions thereof are omitted.

FIG. 1 illustrates a configuration of a web service system (print system) according to the present invention. As illustrated in FIG. 1, a multifunctional peripheral (MFP) 101 serving as a client apparatus is connected to a web server 103 via a network 110 such as the Internet. The server is a server that provides the client apparatus with, for example, a photo sharing site function, and hereinafter the web server 103 is also referred to as the site 103. The MFP 101 is a system for acquiring content information that includes URLs and the like of contents (image data) that are classified according to categories from the content providing site 103 via a relay server 102. The MFP 101 displays a selection screen for selecting a category/content from the information that is acquired from the content providing site 103 without mediating a PC, and after a content to be printed has been selected by a user, acquires image data of the content from the content providing site 103 and executes printing of the image data.

Figure 2:
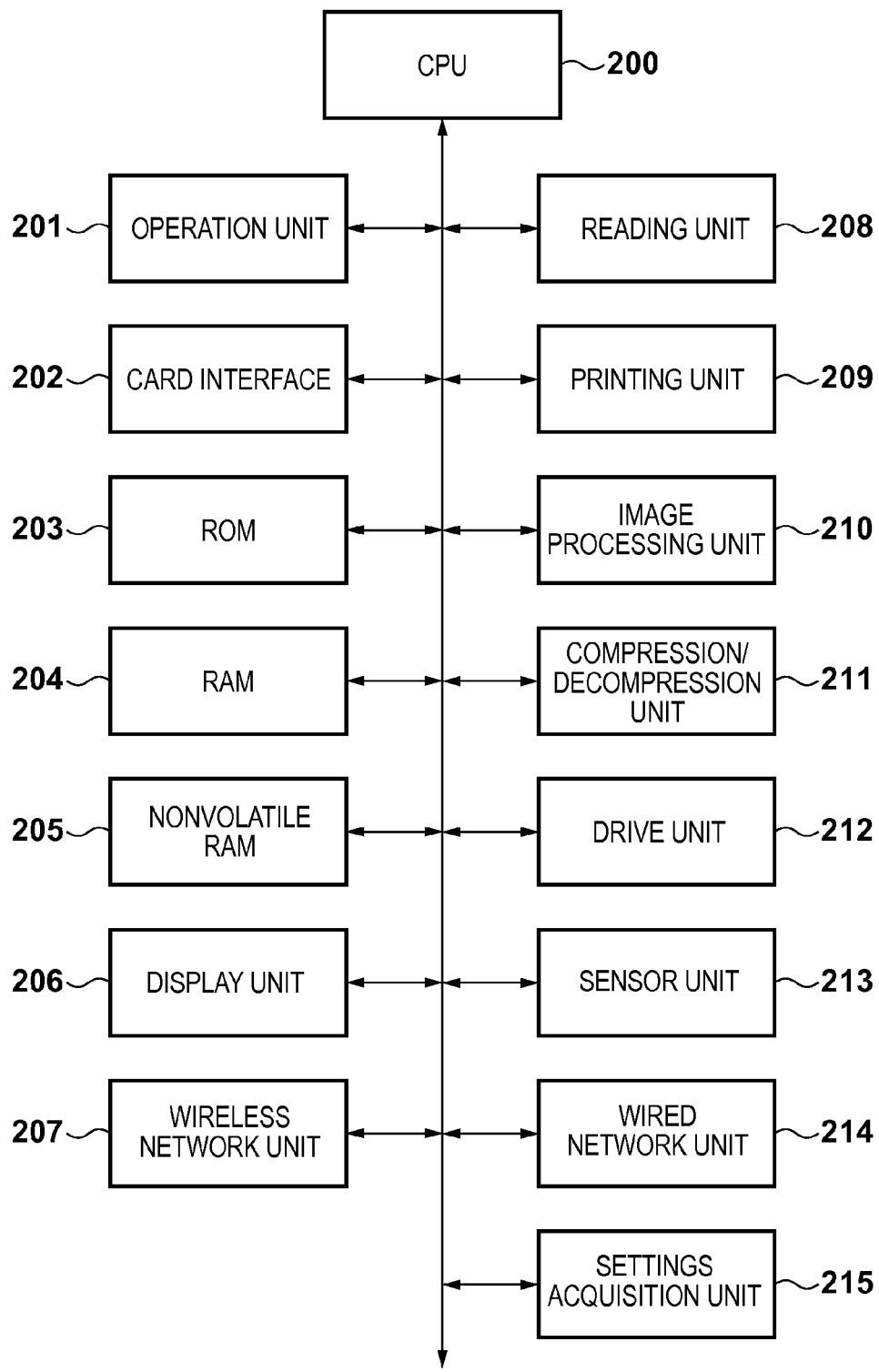
FIG. 2 illustrates a hardware configuration of an MFP.

FIG. 2 illustrates a hardware configuration of the MFP 101. The MFP 101 includes an operation unit 201 such as keys or a touch panel, a card interface 202, a reading unit 208, and a printing unit 209. The MFP 101 also includes a CPU 200, a ROM 203, a RAM 204, a nonvolatile RAM 205, a display unit 206, an image processing unit 210, a compression/decompression unit 211, a drive unit 212, and a sensor unit 213. The CPU 200 performs overall control of the MFP 101, and executes a program stored in the ROM 203 in accordance with a user operation input via the operation unit 201, for example. The ROM 203 stores a control command program for the MFP 101, and the like. Also, the MFP 101 includes a wireless network unit 207, a wired network unit 214, and a settings acquisition unit 215. The wireless network unit 207 is capable of wirelessly communicating with a wireless LAN access point that is compatible with a standard such as IEEE 802.11a. The wired network unit 214 includes an Ethernet (registered trademark) connector to which a twisted pair cable such as 100Base-TX is connectable. Using the wireless network unit 207 or the wired network unit 214, the MFP 101 is capable of communicating with other devices that are connected to the Internet with a TCP/IP protocol. Also, the MFP 101 includes the settings acquisition unit 215. The settings acquisition unit 215 can acquire information from the ROM 203, the RAM 204, the nonvolatile RAM 205, and the like of the MFP 101.

The relay server 102 and the site 103 shown in FIG. 1 employ a configuration of an information processing apparatus such as a general-purpose PC. That is, the relay server 102 and the site 103 each generally includes a CPU, a ROM, a RAM, an HDD, a display unit such as a display, and an input unit such as a pointing device or a keyboard. For example, the CPU deploys on the RAM a program that was read out from the hard disk, the ROM, or the like, and executes the program. The HDD stores programs for executing processing shown by flowcharts, and image data. The display can display a user interface or the like, and by operating the user interface using the pointing device, the keyboard, or the like, the user can input various types of instructions.

Figures 3, 4:
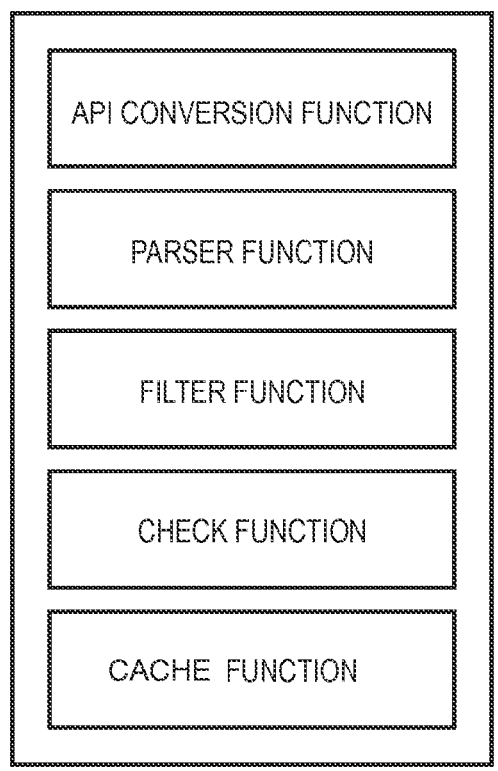
FIG. 3 illustrates a functional configuration of an application of a relay server.
FIG. 4 illustrates a list of APIs between the MFP and the relay server.

FIG. 3 illustrates a functional configuration of an application of the relay server 102. The relay server 102 is a server that has, as a main function, an API conversion function to mediate information acquisition between the MFP 101 and, for example, the content providing site 103 that provides a content providing function as a web application server. The server employs, as a hardware configuration, a configuration of a general-purpose web server. The relay server 102 functions as a web server in its relationship with the MFP 101, and functions as a client in its relationship with the content providing site 103. The main function of the relay server 102 is the API conversion function to acquire information, that is, a category list and a content list, from the content providing site 103 in accordance with "MFP-API" requests defined between the relay server 102 and the MFP 101.

FIG. 4 is a diagram in which "MFP-APIs", which are APIs between the MFP 101 and the relay server 102, are associated with information that is acquired by the relay server 102 in response to the corresponding request. The MFP 101 has multiple functions such as a printing function, a scanning function, and a copy function. Also, the MFP 101 has a network communication function and is configured to be compatible with APIs of the relay server. Instead of being compatible with an API of each site, the MFP 101 issues a request to the relay server 102 via the API with the relay server 102 using HTTP POST communication, in order to acquire information on the site. Here, the APIs between the relay server 102 and the MFP 101 are defined as follows:

API-R1 (condition check): a function to confirm on the basis of a model name, destination information, and an IP address of the MFP 101 whether or not a service can be received;

API-R5 (category list request): a function to acquire information on all categories; and API-R6 (content list request): a function to acquire information on contents registered in the categories.

The MFP 101 can receive an information list (category list, content list) requested of the content providing site 103 from the relay server 102. By designating a URL of a display image from a relevant section of the received information list, it is possible to acquire display image data. Therefore, the MFP 101 acquires the information list via the relay server 102, and acquires data that can be directly acquired by designating a URL, such as image data, directly from the content providing site 103.

When the MFP 101 issues a condition check request API-R1 to the relay server 102, the relay server 102 determines, using a later-described check function, whether or not the content providing function is supported, and returns a result of the determination to the MFP 101. Also, when the MFP 101 issues a category list request API-R5 to the relay server 102, the relay server 102 acquires a category list from the content providing site 103, filters the category list using a later-described filter function, and returns a result of the filtering to the MFP. Similarly, when the MFP 101 issues a content list request API-R6 to the relay server 102, the relay server 102 acquires a content list from the content providing site 103, and returns a result of filtering using the later-described filter function to the MFP.

As illustrated in FIG. 3, the relay server 102 additionally has the following functions:

Parser function: to interpret a category list and a content list that are uniquely defined pieces of information, using parsers appropriate for the respective lists. For example, if the list is described with XML, an XML parser is needed.

Filter function: to specify data to be transmitted to the MFP 101, among data acquired from the content providing site 103, and to delete data other than the specified data. Examples of data that is not to be transmitted to the MFP 101 include contents whose validity has expired, files having file formats other than those designated by the MFP 101, and image data having a file size greater than an upper limit.

Check function: to check, in response to the condition check request from the MFP 101, whether or not the MFP 101 can connect to the content providing site 103 on the basis of a model name, destination information and an IP address of the MFP 101, and information to be transmitted.

Cache function: if a category list or a content list is requested of the content providing site 103 every time a request is received from the MFP 101, the load on the content providing site 103 will increase. Therefore, by caching a category list or a content list that has already been acquired, it is possible to reduce the load on the content providing site 103 and to increase the response speed to the category list request API-R5 or the content list request API-R6.

Figure 5:
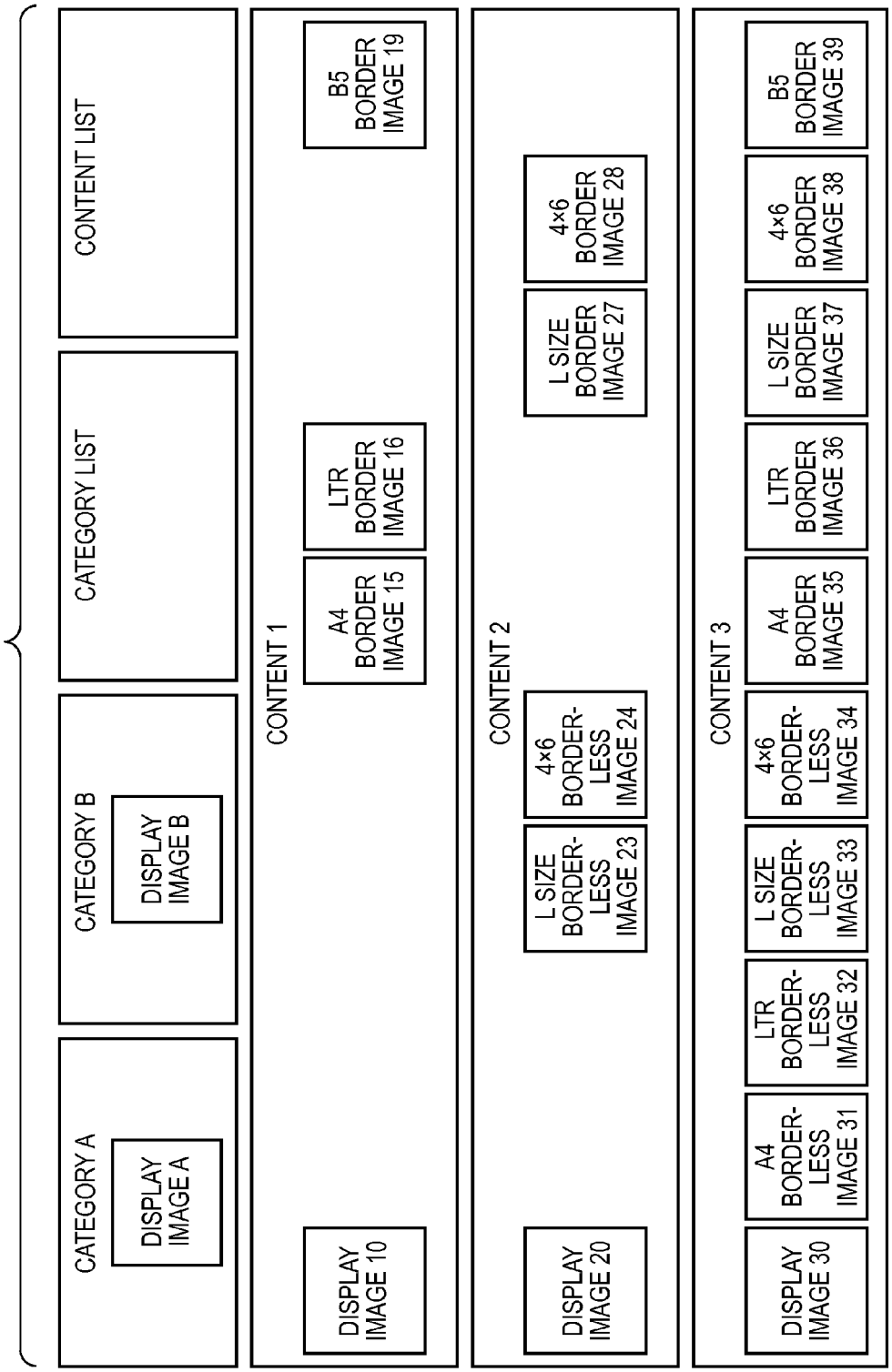
FIG. 5 illustrates a data management configuration of a content providing site.

FIG. 5 illustrates an example of a data management configuration of the content providing site 103, which is a web application server. As illustrated in FIG. 5, two categories, three contents, one category list, and one content list are managed. Also, each category holds a display image for selecting the category. Also, each content holds at least one display image and one print image. Each content includes up to nine print images, i.e., an A4 borderless image, an LTR borderless image, an L size borderless image, a 4×6 borderless image, an A4 border image, an LTR border image, an L size border image, a 4×6 border image, and a B5 border image. Also, the category list and the content list each have, for example, one XML file. The category list and the content list may each have a format other than XML.

FIG. 6 illustrates an example of information to be set for categories. Each category holds information on a target device in which the category is available, and information on provision start and end dates of the available category. For example, a category B indicates that the category is available to MFPs of models 1 and 2 only during the period from Apr. 1, 2011 to Jan. 1, 2012. Also, the category list of FIG. 6 includes URLs (not shown) of display images for the respective categories. For example, a category A includes a URL of a display image A in FIG. 5, and the category B includes a URL of a display image B in FIG. 5. The category list in which these pieces of information are held together is stored in the content providing site 103.

FIG. 7 illustrates an example of information to be set for contents. Each content holds information on a target device in which the content is available, information on provision start and end dates of the available content, and information on the target category, recommended print settings, and available print setting options. For example, a content 2 indicates that it is available to the MFPs of the models 1 and 2 only during the period from Apr. 1, 2011 to Oct. 1, 2011. Also, since the content 2 only supports the category B, display and printing are only possible if the category B is selected in later-described category selection processing in the MFP 101. Also, since information on recommended print settings indicates "L size/4×6", "photo paper", and "borderless", these values are initially displayed as print settings on the display unit 206 at the time of a later-described print instruction in the MFP 101. Although with respect to the paper size, a plurality of pieces of information, that is, L size and 4×6, are indicated, which one is to be defined as a recommended setting will be described later. Also, information on available print setting options indicates "OK" only with respect to "L size borderless", "4×6 borderless", "L size border", and "4×6 border". This means that in the later-described print instruction in the MFP 101, only these values are available for printing.

Also, the content list of FIG. 7 includes URLs (not shown) of display images for the respective contents. For example, the content 2 includes a URL of a display image 20 in FIG. 5. Also, the content list includes URLs (not shown) of print images of print settings that indicate "OK" in information on the available print setting options in FIG. 7. For example, the content 2 includes URLs of an L size borderless image 23, a 4×6 borderless image 24, an L size border image 27, and a 4×6 border image 28. In this case, each available print setting option may include a URL, each paper size may share a common URL, or all the options may include a common URL. For example, A4 size and B5 size that have the same aspect ratio can use a common image since the image can be scaled and printed in the MFP 101. As a result, it is possible to reduce the load of content creation in the content providing site 103 and the capacity for holding contents. The content list in which these pieces of information are held together is stored in the content providing site 103.

As described above, a user can select one category in the MFP 101, and then browse and print at least one image registered in the selected category. Also, since each content can belong to a plurality of categories, the same content, e.g., the content 3, can be displayed in a plurality of categories.

In the present embodiment, the MFP 101 first executes a condition check and determines whether or not it is possible to connect to the content providing site 103. Then, in order to specify data desired to be printed, category information is acquired, and a desired category is selected. A content that is registered in the desired category is specified, print data thereof is acquired, and the acquired print data is printed. This is a flow of processing. The flow of processing is described with reference to FIGS. 8, 9, and 10.

Figure 8:
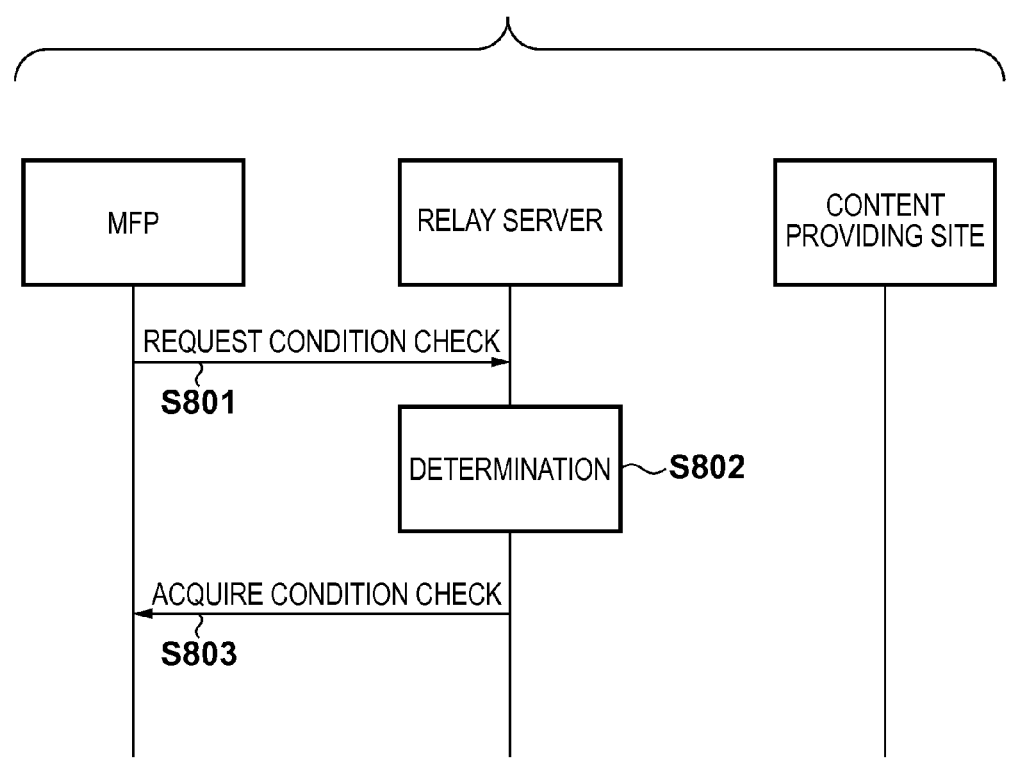
FIG. 8 illustrates a flow of processing at the time of executing a condition check.

FIG. 8 illustrates a flow of processing at the time of executing a condition check. Upon receipt of a condition check request of "API-R1" from the MFP 101 (S801), the relay server 102 performs determination processing (S802). The relay server 102 compares, using the check function, pieces of information on a model name, a destination, an IP address, and the like that is transmitted from the MFP 101 with restriction information of the content providing site 103 that is stored in advance in the relay server 102. Then, the relay server 102 determines whether or not the MFP is an MFP that is connectable to the content providing site 103, and returns a result of the condition check to the MFP 101 (S803).

Figure 9:
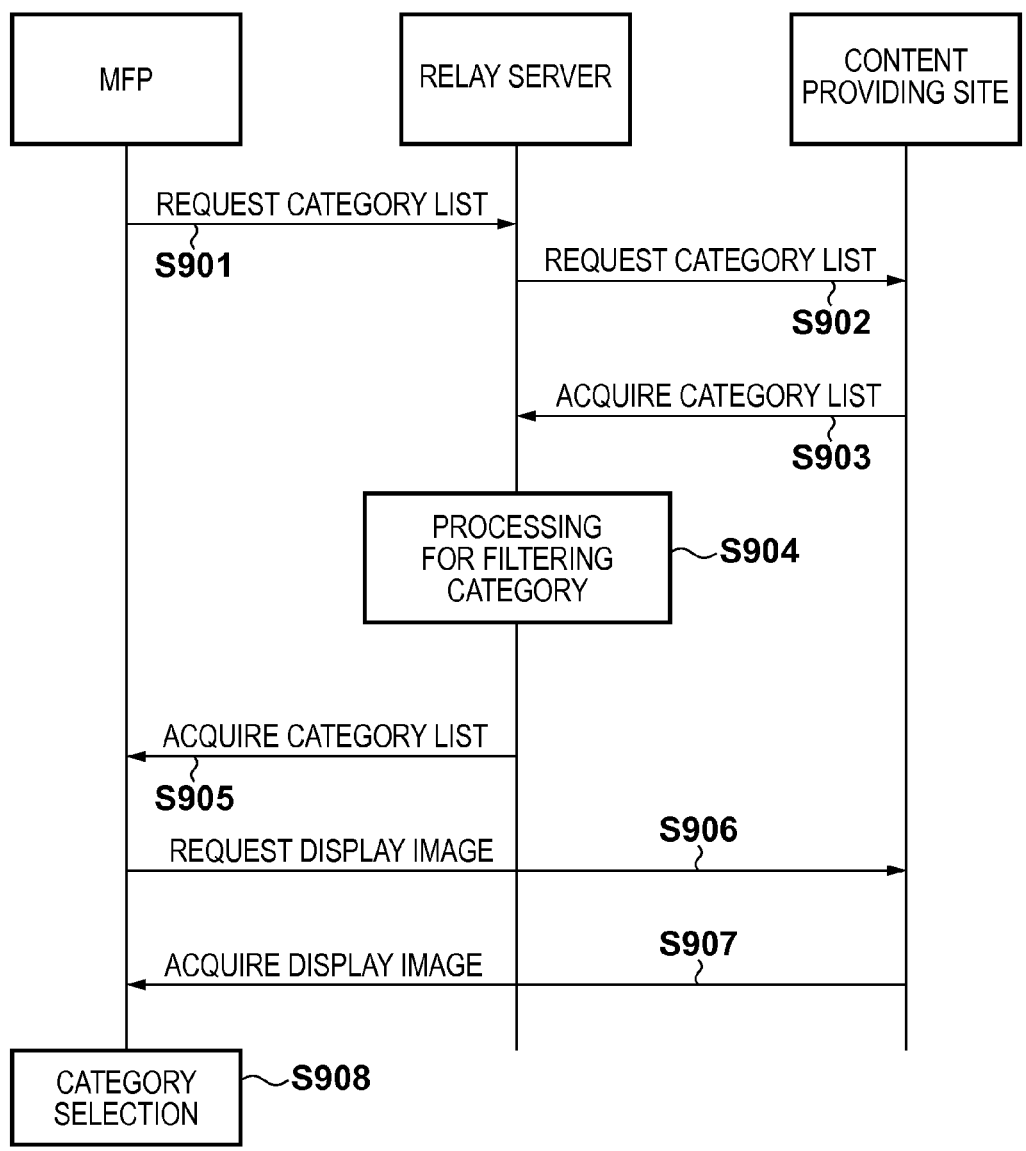
FIG. 9 illustrates a flow of processing for acquiring and displaying category information.

FIG. 9 illustrates a flow of processing for acquiring category information and displaying the acquired category information. Upon receipt of an "API-R5" category list request from the MFP 101 (S901), the relay server 102 issues a category list request to the content providing site 103 (S902). Then, the relay server 102 acquires a category list (S903). Although, in the present embodiment, the category list is acquired from the content providing site 103, it is also possible to use cache information that is stored in the relay server 102 with the use of the cache function of the relay server 102. Subsequently, the relay server 102 parses, using the parser function, the category list among the information on the MFP 101 acquired by the "API-R5", the category list acquired from the content providing site 103, and date information of the relay server, and performs processing for filtering categories (S904).

For example, assuming that the MFP 101 is the model 1, and the date indicated by the date information of the relay server 102 is Aug. 1, 2011, only category B is extracted because the date is after the provision end date of the category A. Also, for example, assuming that the MFP 101 is the model 3, and the date indicated by the date information of the relay server 102 is May 1, 2011, the date of the relay server 102 is included between the provision start date and the provision end date for both categories A and B. However, the category B does not support the model 3, and thus only the category A is extracted. Also, for example, assuming that the MFP 101 is the model 2, and the date of the relay server 102 is May 1, 2011, the date of the relay server 102 is included between the provision start date and the provision end date for both categories A and B. Therefore, the categories A and B are extracted.

Then, the relay server 102 returns a category list as a result of the filtering processing to the MFP 101 (S905). In order to display a category display image for category selection on the display unit of the main body, the MFP 101 issues, to the content providing site 103, an HTTP Get request with respect to display image data of a category that is designated by the user on the basis of the received category information list (S906). Then, the MFP 101 acquires the display image data (S907), and displays the category image for selection on the main body. For example, if the user selects the category B in FIG. 6, the MFP 101 acquires the display image B in FIG. 5. Every time the MFP 101 switches and displays a category for category selection by the user, the MFP 101 acquires a display image designated by the user, as in steps S906 and S907. This acquisition is repeatedly performed on the basis of the URL of the display image data that is described in the category list acquired in step S905. Finally, category selection is performed according to an instruction by the user (S908).

FIG. 10 illustrates a flow of processing from after specifying a category, browsing of content information in the category to specifying and printing a print image. Upon receipt of an "API-R6" content list request from the MFP 101 (S1001), the relay server 102 issues a content list request to the content providing site 103 (S1002). Then, the relay server 102 acquires a content list (S1003). Although, in the present embodiment, the content list is acquired from the content providing site 103, it is also possible to use the cache information that is stored in the relay server 102 using the cache function of the relay server 102. Subsequently, the relay server 102 parses, using the parser function, the content list among the information on the MFP 101 acquired by the "API-R6", the content list acquired from the content providing site 103, and date information of the relay server, and performs processing for filtering contents (S1004).

For example, assuming that the MFP 101 is the model 1, and the dates of the relay server 102 is Aug. 1, 2011, only the category B is extracted in the filtering processing in step S904 in FIG. 9. In this case, the model 1 supports all the contents, the category B supports the contents 2 and 3, and the contents 2 and 3 meet conditions of the expiration date indicated by the provision start date and the provision end date. Therefore, if the user selects the category B, the contents 2 and 3 are extracted.

Also, for example, assuming that the MFP 101 is the model 3, and the dates of the relay server 102 is May 1, 2011, only the category A is extracted in the filtering processing in step S904 in FIG. 9. In this case, the model 3 only supports a content 1, the category A supports the content 1 and a content 3, and the contents 1 and 3 meet conditions of expiration date indicated by the provision start date and the provision end date. Therefore, if the user selects the category A, the content 1 is extracted.

Also, for example, assuming that the MFP 101 is the model 2, and the dates of the relay server 102 is May 1, 2011, the categories A and B are extracted in the filtering processing in step S904 in FIG. 9. In this case, the model 2 supports all the contents that meet the conditions of the expiration date indicated by the provision start date and the provision end date. Therefore, if the user selects the category A, the contents 1 and 3 are extracted, and if the user selects the category B, the contents 2 and 3 are extracted.

Then, the relay server 102 returns a content list as a result of the filtering processing to the MFP 101 (S1005). In order to display a content display image for content selection on the display unit of the main body, the MFP 101 issues, to the content providing site 103, an HTTP Get request with respect to display image data of a content to be printed that is designated on this list on the basis of the received content list (S1006). Then, the MFP 101 acquires the display image data (S1007), and displays the content image for selection on the main body. For example, if the user selects the content 2 in FIG. 7, the MFP 101 acquires the display image 20 in FIG. 5. Every time the MFP 101 switches and displays a content for selection, the MFP 101 repeatedly performs the acquisition on the basis of the URL of the display image data described in the content list that was previously acquired.

Finally, when a content desired to be printed is specified by the user, the user instructs print command to execute printing processing in the MFP 101 (S1008). Execution of printing processing after having instructed the print command will be described later. Thereafter, on the basis of print settings selected by the user, the MFP 101 issues an HTTP Get request to the content providing site 103 in order to acquire the designated print image data (S1009), and acquires print image data from the content providing site 103 (S1010). For example, if the user selects the content 2 in FIG. 7, and selects, as print settings, an L size for the paper size and borderless, the MFP 101 acquires the L size borderless image 23 in FIG. 5. Finally, the MFP 101 deploys the acquired print image data and executes printing thereof (S1011).

Figure 11B:
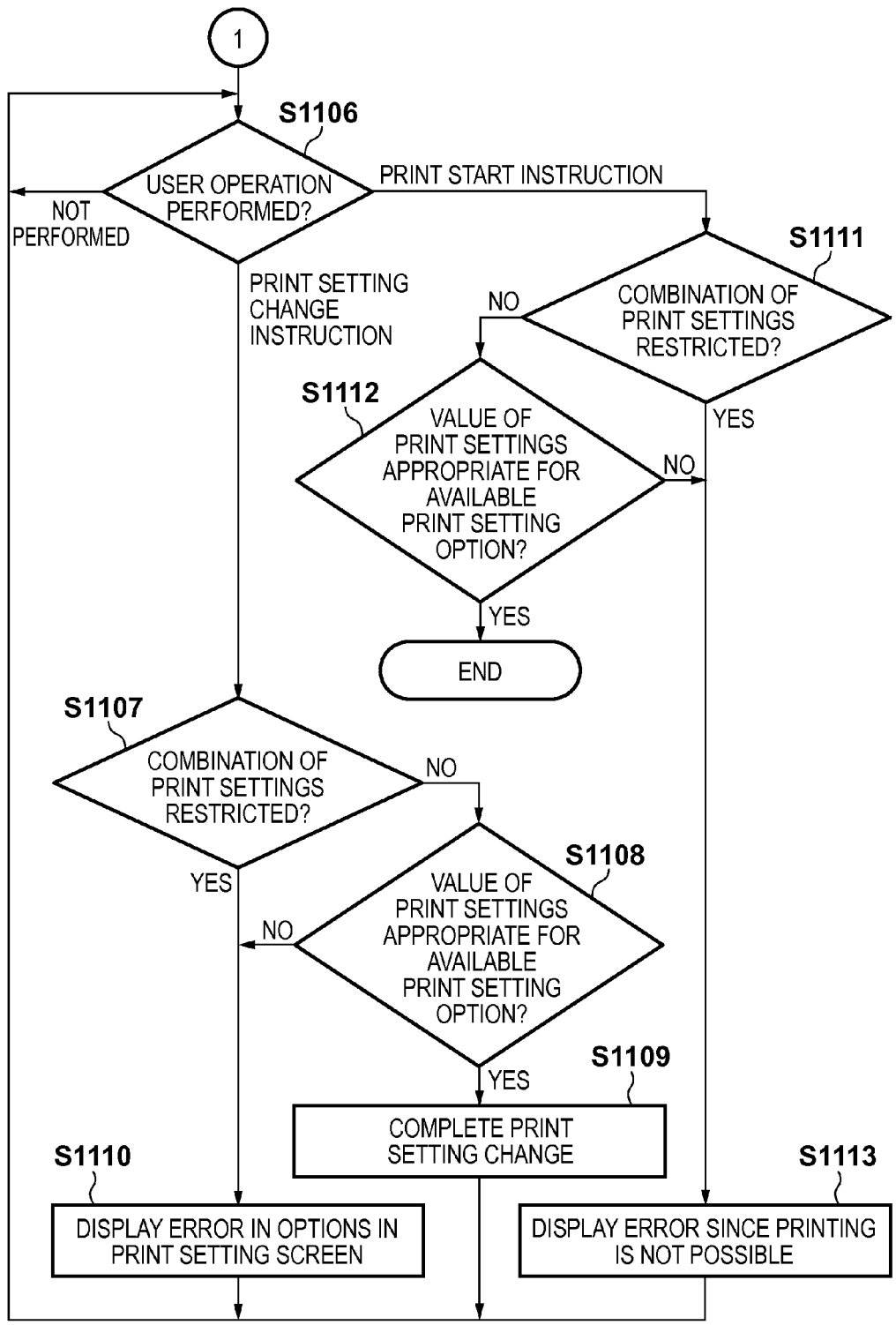

FIGS. 11A and 11B are flowcharts illustrating procedures of print setting processing at the time of instructing to print a content desired to be printed, after the user has decided the content in step S1008 in FIG. 10. The processing shown in FIGS. 11A and 11B are executed by the CPU 200, for example. Since the content list acquired by the MFP 101 in step S1005 includes information on recommended print settings shown in FIG. 7 and print setting options applicable to the content, the CPU 200 acquires, in step S1101, the information that corresponds to the content selected by the user from the content list.

Next, in step S1102, the CPU 200 determines whether or not a plurality of options are set for each item of the recommended print settings acquired in step S1101. For example, if the content selected by the user is the content 1 in FIG. 7, the recommended print settings thereof indicate "A4/LTR" as the paper size, so it is determined that a plurality of options are set, and the processing advances to step S1103. Also, if the content selected by the user is the content 2 in FIG. 7, the recommended print settings thereof indicate "L size/4×6" as the paper size, so it is determined that a plurality of options are set, and processing advances to step S1103. On the other hand, if the content selected by the user is the content 3 in FIG. 7, each item of the recommended print settings thereof indicates only one option, and therefore the processing advances to step S1104.

In step S1103, on the basis of the recommended print settings and information acquired by the settings acquisition unit 215 of the MFP 101, the CPU 200 decides the most appropriate recommended print setting. For example, when a plurality of options are set for the paper size of the recommended print settings, destination information of the MFP 101 is acquired by the settings acquisition unit 215. If the destination information indicates "Japan", the recommended print setting is set to "A4" or "L size", and if the destination information indicates other than "Japan", the recommended print setting is set to "LTR" or "4×6". In the case of the content 1 in FIG. 7, if the destination setting is "Japan", the paper size of the recommended print setting is decided to be "A4", and if the destination setting is other than "Japan", the paper size of the recommended print setting is decided to be "LTR". Also, in the case of the content 2 of FIG. 7, if the destination information indicates "Japan", the paper size of the recommended print setting is decided to be "L size" and if the destination information indicates other than "Japan", the paper size of the recommended print setting is decided to be "4×6".

Here, as a method for deciding the most appropriate recommended print setting, another method than the method using the destination setting of the MFP 101 may be used. For example, a language setting of the MFP 101 may be acquired by the settings acquisition unit 215, and thereby the most appropriate recommended print setting may be decided. Alternatively, position information of the MFP 101 via a GPS module unit (not shown) may be acquired by the settings acquisition unit 215, and thereby the most appropriate recommended print setting may be decided. Alternatively, an IP address held in the wireless network unit 207 or the wired network unit 214 may be acquired by the settings acquisition unit 215 so that position information that is derived from the IP address is acquired, and the most appropriate recommended print setting may be decided using the position information. Alternatively, paper information stored in a paper feed tray from a paper feed tray unit (not shown) may be acquired by the settings acquisition unit 215, and thereby the most appropriate recommended print setting may be decided.

In the method for deciding a recommended print setting using the information acquired by the settings acquisition unit 215, if, for example, a language setting or position information is acquired, and if the language setting is "Japanese" or the position information indicates "Japan", items of the recommended print settings are decided such that the paper size is "A4" or "L size", the paper type is "photo paper", and the border setting is "borderless". Also, if the language setting is other than "Japanese" or the position information is other than "Japan", items of the recommended print settings are decided such that the paper size is "LTR" or "4×6", the paper type is "plain paper", and border setting is "border". Also, if paper information is acquired, recommended print settings are decided, placing priority on the paper information on paper in the paper feed tray. In the above-described example, although only one piece of information that is acquired by the settings acquisition unit 215 is used, the recommended print settings may be decided by using destination information, language information, position information, and paper feed tray information in combination. Also, in the method for deciding recommended print settings using information acquired by the settings acquisition unit 215, instead of the classification into "Japan" and other than "Japan", more detailed classification may be used.

Next, in step S1104, the CPU 200 notifies the user that print settings to be initially displayed on the display unit 206 are recommended print settings for each content. A notification screen will be described later with reference to FIG. 12. In step S1105, the CPU 200 displays on the display unit 206 a print setting screen in which recommended settings for the content selected by the user are set as print settings. The print setting screen will be described later with reference to FIG. 13.

Next, in step S1106, the CPU 200 determines whether or not a user operation using the operation unit 201 was performed. The user operation refers to a change instruction to change from the recommended print settings decided in step S1103 to print setting options that are executable in the MFP 101 and stored in the ROM 203 or a print start instruction. The change instruction to change to the print setting options executable in the MFP 101 will be described later with reference to FIG. 14. If the user operation is a print setting change instruction, the processing advances to step S1107, and if the user operation is a print start instruction, the processing advances to step S1111. Alternatively, if it is determined that a user operation was not performed, the processing in step S1106 is repeated until it is determined that either one of the user operations was performed.

In step S1107, when the user instructs to change print settings, the CPU 200 determines whether or not a combination of print settings is a restricted combination with respect to which printing using the combination is restricted. The determination is executed by referencing print setting information stored in advance in a memory, e.g., the nonvolatile RAM 205 provided in the MFP 101. Specifically, a memory provided in the MFP 101 stores information that indicates combinations of print settings settable in the MFP 101. In step S1107, if the combination of print settings that was changed by the user does not correspond to any of combinations stored in the memory of the MFP 101, the combination is determined to be a restricted combination. Examples of restricted combinations include "B5 size, borderless" and "A4 size, borderless".

On a screen shown in FIG. 13, the user selects, using the operation unit 201, an item that he or she wants to change, among the paper size, the paper type, border setting. On the screen shown in FIG. 13, "paper size: LTR", "paper type: plain paper", "border setting: border" are set as recommended print settings. In step S1105, the screen shown in FIG. 13 is displayed. The user can change, in accordance with left and right arrows, the recommended print settings displayed in FIG. 13 to print settings that are executable by the MFP 101, the print settings being stored in the ROM 203 shown in FIG. 14. For example, if the user changes the paper size using the operation unit 1001, "A4", "LTR", "B5", "L size", and "4×6" are displayed one by one in order, and the user can change "LTR" that is displayed as the current paper size. Alternatively, a configuration is also possible in which all the options of "A4", "LTR", "B5", "L size" and "4×6" are displayed at once, and the user selects a desired paper size among them.

Then, the CPU 200 determines whether or not a combination of print settings designated by the user on the screen in FIG. 13 is a restricted combination, and if the combination of print settings is determined to be a restricted combination, the processing advances to step S1110. On the other hand, if the combination designated by the user is determined not to be a restricted combination, the processing advances to step S1108. Here, examples of restricted combinations include "B5, borderless" that is a combination of the paper size and the border setting, and "plain paper, borderless" that is a combination of the paper type and the border setting. For example, assuming that a content selected by the user is the content 1 in FIG. 7 and the user changes the border setting from "border" to "borderless", the combination is "A4/LTR, plain paper, borderless". This combination does not correspond to any of the combinations that permit printing in the MFP 101 and are stored in the memory provided in the MFP 101, and therefore is determined to be a restricted combination.

In step S1108, the CPU 200 determines whether or not the print settings changed by the user are appropriate for the applicable print setting options acquired from the content list. If it is determined that the print settings are appropriate, the processing advances to step S1109, and if it is determined that the print settings are not appropriate, the processing advances to step S1110. For example, if a content selected by the user is the content 1 in FIG. 7 and the user changes the paper size from LTR to A4 or B5 without changing "border setting" from "border", that option is "OK", so it is determined that the print settings are appropriate. On the other hand, if the user changes the paper size from "LTR" to "L size/4×6", that option is "NA", so it is determined that the print settings are not appropriate. Next, in step S1109, the print setting change by the user is assumed to normally be completed, and the processing advances to step S1106. On the other hand, in step S1110, an error is displayed on the print setting screen, and the processing advances to step S1106. An error screen will be described later with reference to FIG. 15.

Step S1106 is referred to again. If, in step S1106, the user operation is a print start instruction, the CPU 200 determines in step S1111, whether or not the combination of print settings when the user instructed to start printing is compatible with the MFP 101. The processing in step S1111 is the same as in step S1107. Here, if the combination of print settings when the user instructed to start printing is determined to be a restricted combination, the processing advances to step S1113. On the other hand, if the combination of print settings when the user instructed to start printing is a combination compatible with the MFP 101, the processing advances to step S1112.

In step S1112, the CPU 200 determines whether or not the print settings when the user instructed to start printing are appropriate for the applicable print setting options acquired from the content list. The processing in step S1112 is the same as that in step S1108. Here, if it is determined that the print settings are not appropriate for the applicable print setting options, the processing advances to step S1113. On the other hand, if it is determined that the print settings are appropriate for the applicable print setting options, the processing in FIGS. 11A and 11B end and advance to step S1009 to issue an HTTP GET request in order to acquire the designated print image data. In step S1113, the CPU 200 displays an error in order to notify the user that printing is not possible due to the print settings, and the processing advances to step S1106. An error display screen will be described later with reference to FIG. 16. As described above, according to the processing shown in FIGS. 11A and 11B, a combination of print settings that is recommended for the content selected by the user as a print target is displayed on a display screen. Also, in the case where the user changes the print settings, if the changed combination is subject to restriction or is not appropriate for the content of the print target, an error is displayed, so the user can easily designate appropriate print settings. Note that in FIGS. 11A and 11B, display of an error with respect to print settings is performed by referencing the print setting information stored in advance in the memory provided in the MFP 101 and the content list acquired in step S1101. That is, if a combination of print settings selected by the user corresponds to either a restricted combination set with respect to the MFP 101 or a restricted combination set with respect to the content, printing is then restricted. Therefore, even if the print settings selected by the user are appropriate for one of the MFP 101 and the content but are not appropriate for the other, printing can be appropriately restricted. Also, FIGS. 11A and 11B illustrate an example in which similar error display is performed in step S1110, regardless of whether the error display is performed on the basis of the determination result in step S1107 or S1108. However, the error display is not limited to this, and error display may be performed differently depending on whether it is performed on the basis of the determination result in step S1107 or step S1108. This makes it possible to notify the user whether print settings selected by the user are not appropriate for the MFP 101 or for the content. In this case, the determination processing in step S1108 is performed regardless of the determination result in step S1107. If it is determined in both steps S1107 and S1108 that print settings are not appropriate, error display may be performed to notify that print settings selected by the user are not appropriate for both the MFP 101 and the content.

FIG. 12 illustrates a screen that is displayed on the display unit 206 to notify the user in step S1104 that the print settings that are initially displayed are recommended settings for each content. Conventionally, with other functions such as a copy function of the MFP 101, print settings used last time by the user are generally stored in the nonvolatile RAM 204, so this screen notifies the user so as to not perform printing erroneously with the previous settings.

FIG. 13 illustrates a change reception screen for receiving changes of the recommended print settings by the user. In particular, FIG. 13 illustrates a print setting screen when, in step S1105, the content selected by the user is the content 1 in FIG. 7 in the case of the destination setting of the MFP 101 is other than "Japan". FIG. 13 illustrates a screen in which the recommended print settings that are initially displayed, as the most appropriate recommended print settings of the content 1 decided in step S1103, are "LTR" as the paper size, "plain paper" as the paper type, and "border" as the border setting.

By operating the operation unit 201, the user can select setting items ("paper size", "paper type" and "border setting") of the print settings on the screen shown in FIG. 13, and select setting details of the selected setting items. If the operation unit 201 includes keys corresponding to up/down and left/right, the user can select setting items by pressing the up/down keys, and select setting details by pressing the left/right keys. If the operation unit 201 includes a touch panel, the user selects setting items by a flick operation in a vertical direction, and select setting details by a flick operation in a lateral direction. If the operation unit 201 includes a touch panel, another method may be employed in which when the user touches displayed positions of the setting items, setting content candidates included in these setting items are displayed, and the user can select a setting content from the setting content candidates.

FIG. 14 illustrates a list of print settings executable in the device of the MFP 101, the list being stored in the ROM 203. On the basis of the list of FIG. 14, the CPU 200 performs control to display "A4, LTR, B5, L size, 4×6" as the paper size, "plain paper, matte paper, photo paper, semi gloss paper" as the paper type, "border, borderless" as the border setting, as illustrated in FIG. 13, so that the user can change the settings.

FIG. 15 is the print setting screen in step S1110 on which an error is displayed. In FIG. 15, "4×6", "plain paper", and "border" for the content 1 are displayed. However, since the items of "4×6, border" are not recommended print settings and are also set to "NA" in applicable print setting options, the combination of print settings is determined to be inappropriate. Therefore, "!" is displayed in the place of the paper size. In this case, the print settings will be applicable if the user changes the paper size.

FIG. 16 illustrates a warning screen in step S1113 displaying a warning that the user cannot perform printing with the current print settings since the print settings are subject to restriction.

As described above, in the present embodiment, the MFP 101 acquires from the relay server 102 recommended print settings and applicable print setting options for each content, and determines, by combining them with executable print settings stored in the MFP 101, whether or not printing is possible. As a result, the recommended print settings for each content can be directly set easily and the user can be notified of recommended print settings intended by the content creator. Also, by restricting the print settings that are selectable for each content to a predetermined range, it is possible to reduce the images to be prepared for each content so as to ease the load of content creation or to reduce the capacity of a server. Also, by restricting the print settings that are selectable for each content, it is possible to improve user operationality of print setting.

Although the present embodiment has described taking the system constituted by the MFP 101, the relay server 102, and the content providing site 103 as an example, the system is not limited to this configuration. A configuration without the relay server 102 is also possible by all the procedures performed in the relay server 102 being performed in the MFP 101 and/or the content providing site 103, or in a server (not shown), a second MFP, or a PC connected to the MFP 101.

Also, in the present embodiment, an example of data management in the content providing site 103 has been described in detail with reference to FIG. 5, an example of information set for each content has been described in detail with reference to FIG. 7, and print instruction processing after the user has decided a content desired to be printed has been described in detail with reference to FIGS. 11A and 11B. However, the present invention is these examples are not limited to the examples given in the drawings and flowcharts.

Also, the content list may not necessarily include recommended print settings. In this case, before step S1102, it is determined whether or not there is information on recommended print settings in the content list, and if it is determined that there is such information, the processing in step S1102 is performed. On the other hand, if it is determined that there is no such information, print settings that were used at the time of the previous printing and stored in the nonvolatile RAM 205 are adopted as recommended settings, and the processing advances to step S1105 without displaying the screen of FIG. 12.

Also, the print settings used at the time of the previous printing may be stored in the nonvolatile RAM 205, and before step S1104, it may be determined whether or not the stored print settings and the recommended settings are the same. If the stored print settings and the recommended settings are determined to be the same, the processing may advance to step S1105, omitting step S1104. Also, in step S1105, recommended print settings may not automatically be set as print setting to be initially displayed, and the user may be asked whether or not the print setting that are initially displayed should be set as recommended print settings. In this case, instead of the processing in step S1104, a screen for asking the user is displayed. Then, according to a selection result of the user, it is decided whether the print settings that are initially displayed or the previous print settings stored in the nonvolatile RAM 205 are to be set as recommended print settings. Further, it is determined whether or not the recommended print settings are specified print settings, and if the recommended print settings are determined to be specified print settings, it is not necessary to ask the user. For example, if information on the size and type of paper in the paper feed tray can be acquired, and values of the paper size and paper type of the recommended print settings are equivalent to those of the paper in the paper feed tray, the paper size and paper type are automatically set to the print settings that are initially displayed without asking the user.

Also, the error screen shown in FIG. 15 is displayed in step S1110 in cases such as where it is determined that a combination of print settings is subject to restriction, but a configuration is also possible in which a print settings option that is subject to restriction cannot be selected when changing the print settings in step S1106. For example, assuming that in the MFP 101, printing with a combination of "A4, borderless" is restricted, if "A4" is selected as the paper size and the user selects the setting item of "the border setting" as a target for setting change, "borderless" is eliminated from the options. With this, it is possible to prevent the user from designating "borderless". Note that when "borderless" is eliminated from the options, "borderless" may be eliminated from the display target or may be displayed, with being distinguished from "border", so as to notify the user that "borderless" cannot be selected or an error occurs if "borderless" is selected. At this time, display may be performed such that "borderless" is restricted since the paper size "A4" is selected, that "borderless" can be selected if the paper size is changed to "L size", or the like.

Although the content list includes information on recommended print settings and applicable print setting options, it is also possible that the information is acquired separately from the content list. For example, the information on recommended print settings and applicable print setting options may be included in part of the display image acquired in the display image acquisition processing in step S1007. Alternatively, the print instruction processing in step S1008 is performed after the print image request processing in step S1009 and the print image acquisition processing in step S1010, so that the information on recommended print settings and applicable print setting options may be included in part of the print image acquired in the print image acquisition processing in step S1010. Alternatively, only the information on recommended print settings and applicable print setting options may be acquired separately from the relay server 102 or the content providing site 103.

Other Embodiments

Aspects of the present invention can also be realized by a computer of a system or apparatus (or devices such as a CPU or MPU) that reads out and executes a program recorded on a memory device to perform the functions of the above-described embodiment(s), and by a method, the steps of which are performed by a computer of a system or apparatus by, for example, reading out and executing a program recorded on a memory device to perform the functions of the above-described embodiment(s). For this purpose, the program is provided to the computer for example via a network or from a recording medium of various types serving as the memory device (e.g., computer-readable medium).

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2012-151808, filed Jul. 5, 2012, which is hereby incorporated by reference herein in its entirety.

What is claimed is:

1. An apparatus comprising:
a selection unit configured to select display content corresponding to a plurality of print images, which have been stored in a memory and correspond to print medium sizes different from each other, from first display content and second display content according to an instruction of a user,
wherein the first display content corresponds to both of a plurality of first print images, which have been stored in the memory and correspond to first print medium sizes different from each other, and a first recommended print setting including a print medium size in the first print sizes, and
the second display content corresponds to both of a plurality of second print images, which have been stored in the memory and correspond to second print medium sizes different from each other, and a second recommended print setting including a print medium size in the second print medium sizes;
a display control unit configured to control a display device to display, of the first recommended print setting and the second recommended print setting, a recommended print setting corresponding to the display content selected from the first display content and the second display content by the selection unit; and
a print control unit configured to acquire a print image, among the plurality of print images corresponding to the print medium sizes different from each other, corresponding to the selected display content and a print medium size which is designated by a user in the print medium sizes after the recommended print setting is displayed by the display control unit, and to control a printing device to print the acquired print image.

2. The apparatus according to claim 1, wherein the print control unit causes the printing device not to print of the plurality of images corresponding to the selected display content according to a restricted print setting whose use with respect to the selected display content is restricted.

3. The apparatus according to claim 2, wherein the display control unit controls the display device to display restriction information indicating that printing of a print image corresponding to the selected display content that uses the restricted print setting is restricted.

4. The apparatus according to claim 3, wherein the display control unit controls the display device to display the restriction information upon input of a user instruction to execute printing of a print image corresponding to the selected display content using the restricted print setting.

5. The apparatus according to claim 2, wherein the restricted print setting is a combination of a plurality of setting items.

6. The apparatus according to claim 5, wherein the plurality of setting items include a print medium size, a print medium type, and a border setting.

7. The apparatus according to claim 1, wherein the display control unit controls the display device to display a recommended combination, corresponding to the selected display content, of a plurality of setting items as the recommended print setting.

8. The apparatus according to claim 7, wherein the plurality of setting items include a print medium size, a print medium type, and a border setting.

9. The apparatus according to claim 1,
wherein the display control unit controls the display device to display the recommended print setting and a print setting different from the recommended print setting so as to enable the user to perform selection, and
the print control unit controls the printing device to print the print image according to a print setting selected by the user in the display device from the recommended print setting and the print setting different from the recommended print setting.

10. The apparatus according to claim 9, wherein the display control unit performs the display such that the recommended print setting is preferentially displayed as a candidate for selection by the user and then the print setting different from the recommended print setting is displayed in a case where an instruction by the user is input.

11. The apparatus according to claim 1, wherein the apparatus comprises the display device and the printing device.

12. A method that utilizes a processor to print an image, the method comprising:
selecting, using the processor, display content corresponding to a plurality of print images, which have been stored in a memory and correspond to print medium sizes different from each other, from first display content and second display content according to an instruction of a user, wherein the first display content corresponds to both of a plurality of first print images, which have been stored in the memory and correspond to first print medium sizes different from each other, and a first recommended print setting including a print medium size in the first print sizes, and the second display content corresponds to both of a plurality of second print images, which have been stored in the memory and correspond to second print medium sizes different from each other, and a second recommended print setting including a print medium size in the second print medium sizes;
controlling, using the processor, a display device to display, of the first recommended print setting and the second recommended print setting, a recommended print setting corresponding to the display content selected from the first display content and the second display content;
acquiring, using the processor, a print image, among the plurality of print images corresponding to the print medium sizes different from each other, corresponding to the selected display content and a print medium size which is designated by a user in the print medium sizes after the recommended print setting is displayed; and
controlling a printing device to print the acquired image.

13. A non-transitory computer-readable medium storing a program for causing a computer to execute:
selecting display content corresponding to a plurality of print images, which have been stored in a memory and correspond to print medium sizes different from each other, from first display content and second display content according to an instruction of a user, wherein the first display content corresponds to both of a plurality of first print images, which have been stored in the memory and correspond to first print medium sizes different from each other, and a first recommended print setting including a print medium size in the first print sizes, and the second display content corresponds to both of a plurality of second print images, which have been stored in the memory and correspond to second print medium sizes different from each other, and a second recommended print setting including a print medium size in the second print medium sizes;
controlling a display device to display, of the first recommended print setting and the second recommended print setting, a recommended print setting corresponding to the display content selected from the first display content and the second display content;
acquiring a print image, among the plurality of print images corresponding to the print medium sizes different from each other, corresponding to the selected display content and a print medium size which is designated by a user in the print medium sizes after the recommended print setting is displayed; and
controlling a printing device to print the acquired image.

14. A system comprising:
a selection unit configured to select display content corresponding to a plurality of print images which have been stored in a web server and correspond to print medium sizes different from each other, from first display content and second display content according to an instruction of a user,
wherein the first display content corresponds to both of a plurality of first print images which have been stored in the web server and correspond to first print medium sizes different from each other, and a first recommended print setting including a print medium size in the first print medium sizes, and
the second display content corresponds to both of a plurality of second print images which have been stored in the web server and correspond to second print medium sizes different from each other, and a second recommended print setting including a print medium size in the second print medium sizes;
a display unit configured to display, of the first recommended print setting and the second recommended print setting, a recommended print setting corresponding to the display content selected from the first display content and the second display content by the selecting unit; and a print unit configured to acquire a print image, among the plurality of print images corresponding to the print medium sizes different from each other, corresponding to the selected display content and a print medium size which is designated by a user in the print medium sizes after the recommended print setting is displayed by the display unit, and to print the acquired print image.

15. The system according to claim 14,
wherein the web server including the first display content and the second display content, a relay server, and a printing device is included in the system, and
wherein the printing device comprises the selection unit, the display unit, and the print unit.

16. The system according to claim 15, wherein the relay server extracts first content corresponding to the first display content and second content corresponding to the second display content from a plurality of contents included in the web server, and the selection unit of the printing device selects the display content from the first display content corresponding to the extracted first content and the second display content corresponding to the extracted second content.

17. The system according to claim 16, wherein the relay server extracts the first content and the second content, from the plurality of contents included in the web server, based on time information corresponding to each of the plurality of contents.

18. The system according to claim 17, wherein the time information includes expiration date information corresponding to each of the plurality of contents, and in a case where date information of the relay server satisfies the expiration date information corresponding to each of the first content and the second content, the relay server extracts the first content and the second content, from the plurality of contents included in the web server.

* * * * *